Figure 2:
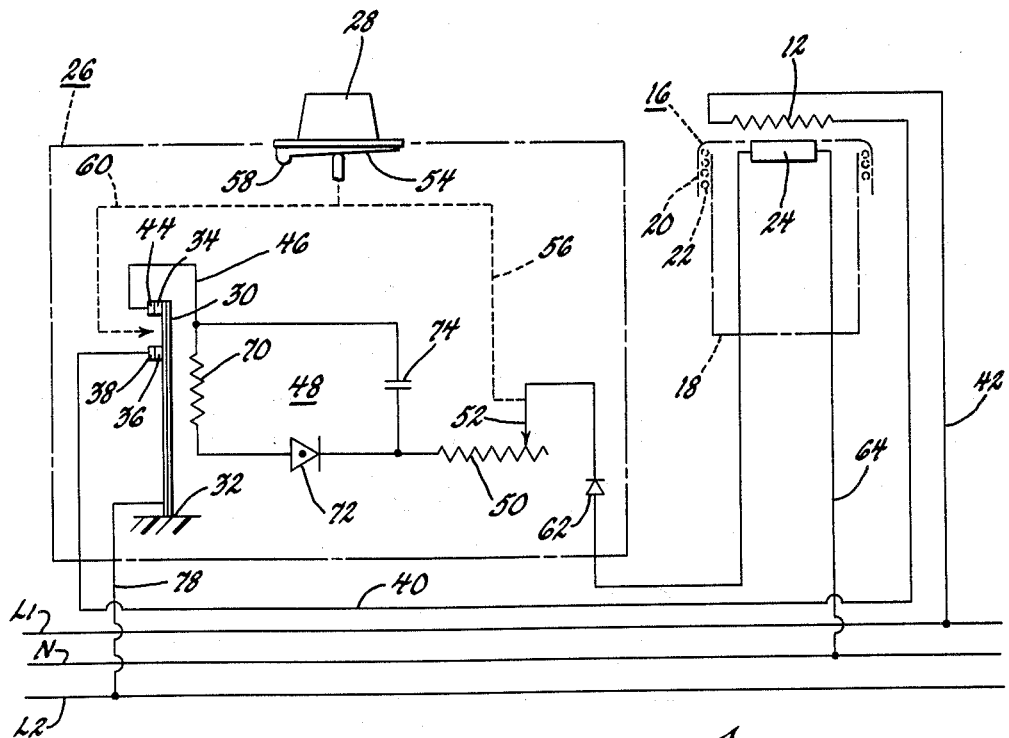

INVENTOR.
James W. Jacobs
BY Frederick M. Ritchie
HIS ATTORNEY

United States Patent Office

3,115,565
Patented Dec. 24, 1963

3,115,565
DOMESTIC ELECTRIC HEATING APPLIANCE
James W. Jacobs, Dayton, Ohio, assignor to General Motors Corporation, Detroit, Mich., a corporation of Delaware
Filed Nov. 25, 1960, Ser. No. 71,580
4 Claims. (Cl. 219—20)

This invention relates to a domestic appliance and more particularly to an improved temperature sensitive control for a surface cooking unit.

Many of the electric ranges in use today include a temperature responsive control system for at least one of the surface cooking units. The function of such a control is to sense the temperature of any utensil resting on the cooking unit, thereby to control the rate of heat output from the surface cooking unit so that the utensil is maintained at a predetermined temperature. In the prior art two systems have been used. One system utilizes a plurality of bimetallic elements selectively to open and close or pulse a circuit supplying power to the surface cooking unit. Another system utilizes a hydraulic arrangement wherein the temperature of the cooking utensil is reflected through a capillary tube to a control which alters accordingly the amount of power supplied to the cooking unit. Both of these systems tend to get out of calibration easily and are somewhat complex in their construction.

Accordingly, it is an object of this invention to provide a temperature sensitive control for an electric cooking unit which has a simplified construction and an increased sensitivity to temperature fluctuations at the cooking unit.

It is a general object of this invention to provide a temperature sensitive cooking unit control with a variable timing circuit.

It is a more specific object of this invention to provide a temperature sensitive control system for a surface cooking unit with a transistor diode timing circuit including a four layer hyperconductive negative resistance transistor diode for controlling the pulsing rate at which power is supplied to the surface cooking unit.

Further objects and advantages of the present invention will be apparent from the following description, reference being had to the accompanying drawings wherein preferred embodiments of the present invention are clearly shown.

Figure 1:
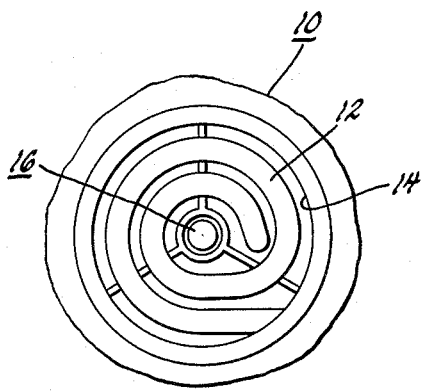

In the drawings:

FIGURE 1 is a fragmentary elevational view of a tubular sheathed heating element suitable for use with this invention; and FIGURE 2 is a schematic wiring diagram of the control of this invention.

In accordance with this invention and with reference to FIGURE 1, an electric range 10 is illustrated as having a conventional tubular sheathed heating element such as 12 supported in an opening 14 in the top of the range. The surface cooking unit or heating element 12 is of the temperature responsive type in which a temperature sensing element 16 is positioned in the center of the cooking unit 12 in a manner that will place the element in intimate thermal contact with any utensil placed on the cooking unit 12. A conventional domestic power supply of 230 volts is used to energize the surface cooking unit 12 and it is to the control of this power supply in accordance with a preselected cooking temperature that this invention is directed.

Turning now to FIGURE 2, the temperature sensing control of this invention will now be more clearly described. The temperature sensing element 16 includes a body portion 18 and a cap 20 biased upwardly by a spring 22 into intimate thermal contact with the bottom of any utensil (not shown) resting upon the heating element 12. To the under side of the sensing element cap 20 there is positioned a thermistor 24 or other suitable device, the resistance of which varies inversely with temperature. As the temperature of a pan, and thus the food therein, setting on the surface cooking unit 12 increases, the resistance of the thermistor 24 will decrease to pass additional current to a remote master pulsing control unit shown generally at 26 and described more fully next following. The control unit 26 includes a 230-volt power supply circuit and a 115-volt control circuit. In general, the control circuit senses and reflects the pan temperature in a manner to open and close the power supply circuit to the cooking unit, thereby regulating pan temperature.

The master pulsing unit for the temperature sensing control includes a control knob 28 which may be positioned on the control panel of any conventional electric range. Within the pulsing unit 26 there is disposed a bimetal 30 or other thermally responsive device which is affixed at one end as at 32. The bimetal 30 carries a first control circuit contact 34 and a first power supply contact 36. The power supply contact 36 cooperates with a second power supply contact 38 which is connected through a conductor 40 of the power supply circuit to the one end of the surface heating element 12—the other side of the heating element 12 being connected through a conductor 42 to one side $L_1$ of a domestic 230-volt power supply having main line conductors $L_1$, $L_2$ and a neutral N.

The control circuit includes a second control contact 44 which is selectively engaged by the bimetal contact 34 and is thus intermittently connected by way of a conductor 46 with a capacitive timing circuit shown generally at 48. The timing circuit 48, which is an unstable cyclic circuitry is connected to a rheostat or variable resistance 50 which includes a contact blade or wiper 52 shiftable through a cam 54 on the control knob 28. Any conventional mechanical linkage, such as represented by the dashed line 56, may be used to interconnect the knob and rheostat. Note also that the rotation of the control knob may cause a protuberance 58 to bias the bimetal 30 permanently into a completely open position wherein contacts 34 and 44 are disengaged as well as contacts 36 and 38—a mechanical linkage 60 between knob and bimetal serving this purpose. In series with the rheostat 50 is a rectifier or diode 62, one side of which is connected to the thermistor 24. At the opposite side of the thermistor 24, a conductor 64 connects the thermistor to the neutral N side of the power supply.

The capacitive timing circuit 48 will now be described more fully. Generally speaking, the object of the timing circuit is to reflect a temperature sensed at the sensing head 16 and to transpose this sensed temperature into a pulsed signal in any means 70 which will actuate the bimetal 30. More particularly, the timing circuit includes a heater or resistance 70 and a four-layer hyper-conductive negative resistance transistor diode 72. In parallel with the diode 72 and the heater 70 is a capacitor 74. The parallel timing circuit 48 is thus interposed between the bimetal 30 and the temperature sensing thermistor 24. In accordance with a preset temperature selected by the knob 28, the rheostat wiper blade 52 will be positioned along the rheostat resistance 50 so that the timing circuit 48 will be effective to regulate the amount of heat output by the heater 70 to actuate the bimetal.

Since the timing circuit operates on 60 cycles, the capacitor 74 is pulsed with pulsating direct current until a predetermined charge is built up in the capacitor. The four layer diode 72 then discharges the capacitor through the heater. This is a repetitive cycle of short duration which gradually heats the heater 70 to the point where it will operate the bimetal switch to deenergize the heater. The bimetal switch thus cycles the cooking unit to obtain the desired temperature in the pan.

In other words the bimetal 30 is caused to flex by an actuator or heater 70 connected in series with the negative resistance diode 72. Since both are connected in parallel with a capacitor 74, the timing circuit 48 is conditioned to create a signal through the diode 72 whenever the capacitor has taken on a charge sufficient to cause an avalanche effect through the diode and the heater 70. The parallel circuit is connected through the rectifier 62 to the alternating current power soruce $L_1$, $L_2$ and N and the rectifier is arranged in the reverse relation relative to the diode so that half waves only (D.C.) are passed to the timing circuit 48. The rate of operation of the timing circuit and more particularly the heat output of the heating element 70 is controlled by a resistor or rheostat 50 connected in series with the parallel circuit. The foregoing description of the timing circuit is believed sufficient for the aspects of this invention. However, for additional information relative to the theory of operation and design of the capacitive timing circuit 48, reference may be had to the copending application S.N. 71,581 filed November 25, 1960, and assigned to the same assignee as this invention.

In operation, a utensil is placed on the surface cooking unit 12 in a manner that the cap 20 of the temperature sensing device 16 is biased into engagement with the bottom thereof. The power is turned on through the rotary knob 28—the cam surface 54 biasing a rheostat selector 52 through any conventional linkage 56 to the desired temperature setting. As aforesaid, a positive block or lock out for the bimetal 30 is afforded by the linkage 60 which is released whenever the knob 28 is turned to any of the cooking temperature settings. At the initiation of a cooking cycle, the bimetal 30 will be cold and in the position shown in FIGURE 2. Thus, power will flow to the surface cooking unit 12 from $L_1$, conductor 42, the heating element 12, conductor 40, power supply contact 38, power supply contact 36, bimetal 30 and conductor 78 to the other side of the power supply $L^2$. As the ingredients in the pan heat up, this temperature increase is reflected in the cap 20 and thus the thermistor 24. As the thermistor 24 heats up, its resistance goes down and additional control power is supplied to the timing circuit 48 by way of conductor 64 and the rectifier 62. The amount of D.C. power signals passed is governed by the rheostat or variable resistance 50 preset in accordance with the temperature selection. These signals are charged into the capacitor 74 until the firing voltage of the negative resistance diode 72 is reached. Then the capacitor will discharge through the diode 72 and the heater 70. Thus, a measured amount of heat is transferred from the heater 70 to the bimetal 30. Depending on the amount of firing pulses through the diode 72, the heater 70 will put out more or less heat and the bimetal will open more or less quickly. As soon as the bimetal 30 flexes to the open position, the power supply circuit to the heating element 12 is interrupted at the power supply contacts 36 and 38. At the same time, the control circuit to the timing circuit 48 is interrupted at the control circuit contacts 34 and 44. Thus, the heating element 12 is deenergized briefly to hold the temperature of the utensil at the selected temperature. As the bimetal 30 cools, the contacts 44 and 38 are reengaged and the cycle is repeated throughout the cooking operation to maintain the desired temperature setting.

It should now be seen that an improved simplified temperature responsive control circuit for an electric range has been taught by this invention. The control is extremely sensitive and will better retain its calibration throughout the life of the control.

While the embodiments of the present invention as herein disclosed, constitute preferred forms, it is to be understood that other forms might be adopted.

What is claimed is as follows:

1. In combination with an electric cooking unit adapted to support a utensil, a thermally responsive control comprising a thermistor in heat sensing relationship to said utensil, a first and second contact forming a first pulsing switch in circuit with said thermistor, a second and third contact forming a second pulsing switch connected directly to one side of said cooking unit, a single bimetal means for opening and closing said first and second pulsing switches, a heater for actuating said single bimetal means, a negative resistance diode connected in series with said heater, said diode having a predetermined switching voltage, a capacitor connected in a parallel circuit with the heater and diode, said capacitor being capable of being charged to a voltage great enough to exceed the switching voltage of said diode, a rheostat for controlling the charging rate of said capacitor to regulate said cooking unit, a rectifier connected in series with said thermistor, said rheostat, said parallel circuit and said bimetal means and oriented to prevent flow of current through said diode before said diode reaches its switching voltage, and an alternating current power supply having a peak output voltage greater than the switching voltage of said diode and including a first line conductor and a neutral line conductor for supplying energy directly to said single bimetal means and said thermistor for repeatedly energizing said heater and a second line conductor connected directly to the other side of said cooking unit and thereby in series with said second pulsing switch for supplying energy selectively and directly to said cooking unit, said negative resistance diode being in the form of a four layer transistor.

2. In combination with an electric cooking unit adapted to support a utensil, a thermally responsive control comprising a thermistor in heat sensing relationship to said utensil, a first and second contact forming a pulsing switch in circuit with said thermistor, a second and third contact forming another pulsing switch in direct series power supply relationship to said cooking unit, bimetal means for simultaneously opening and closing both of said pulsing switches, a heater adjacent said bimetal means for actuating said bimetal means, a four layer hyperconductive negative resistance diode connected in series with said actuator, said diode having a predetermined switching voltage, a capacitor connected in a parallel circuit with the actuator and diode, said capacitor being capable of being charged to a voltage great enough to exceed the switching voltage of said diode, a rheostat for controlling the charging rate of said capacitor to regulate said cooking unit, a rectifier connected in series with said thermistor, said rheostat, said parallel circuit and said bimetal means and oriented to prevent flow of current through said diode before said diode reaches its switching voltage, and an alternating current power supply having a peak output voltage greater than the switching voltage of said diode and having one conductor connected directly to said bimetal means and another conductor connected directly to said thermistor for supplying energy directly to said bimetal means and said thermistor for repeatedly energizing said actuator.

3. In combination with a power source, a range control for a surface unit connected to said power source and adapted to support a utensil comprising, contact means including a first contact connected to said power source and a second contact connected directly to said surface unit, bimetal means for repeatedly automatically operating said contact means to repeatedly directly interrupt power supply to said surface unit, heating means for said bimetal means, and means connected to said heating means for repeatedly periodically energizing said heating means including a capacitive circuit having a capacitor and a negative resistance diode in parallel relationship and a rectifier in series with said capacitive circuit, the charging rate of said capacitor being automatically varied in response to the temperature of said utensil to control the rate of intermittent discharge of said capacitive circuit through said heating means.

4. The combination of claim 3 wherein said first contact is connected to said power source through a portion of said bimetal means whereby to make said bimetal means self-heating when said first contact is engaged with said second contact.

References Cited in the file of this patent
UNITED STATES PATENTS

| | | |
|---|---|---|
| 2,866,106 | Schuh | Dec. 23, 1958 |
| 2,947,916 | Beck | Aug. 2, 1960 |
| 2,970,201 | Woodward | Jan. 31, 1961 |
| 2,971,074 | Strobel et al. | Feb. 7, 1961 |
| 3,018,356 | Busch et al. | Jan. 23, 1962 |
| 3,030,523 | Pittman | Apr. 17, 1962 |